(12) United States Patent
Kato et al.

(10) Patent No.: US 7,151,799 B2
(45) Date of Patent: Dec. 19, 2006

(54) TRANSCODER FOR CODED VIDEO

(75) Inventors: Haruhisa Kato, Saitama (JP); Yasuyuki Nakajima, Saitama (JP)

(73) Assignee: KDDI Corporation, Tokyo (JP)

( * ) Notice: Subject to any disclaimer, the term of this patent is extended or adjusted under 35 U.S.C. 154(b) by 686 days.

(21) Appl. No.: 10/384,708

(22) Filed: Mar. 11, 2003

(65) Prior Publication Data

US 2003/0174770 A1  Sep. 18, 2003

(30) Foreign Application Priority Data

Mar. 14, 2002  (JP)  ............................... 2002-070878

(51) Int. Cl.
  H04N 7/12   (2006.01)
  H04B 1/66   (2006.01)
(52) U.S. Cl. .............................. 375/240.16; 375/240.02
(58) Field of Classification Search .......... 375/240.16, 375/240.02, 240.26, 240.1; 382/248, 236; 348/400.1, 397
See application file for complete search history.

(56) References Cited

U.S. PATENT DOCUMENTS

| 4,941,042 A | * | 7/1990 | Martens .................... 348/400.1 |
| 5,982,432 A | | 11/1999 | Uenoyama et al. |
| 6,526,099 B1 | * | 2/2003 | Christopoulos et al. ...................... 375/240.26 |
| 6,560,282 B1 | * | 5/2003 | Tahara et al. ............ 375/240.02 |
| 6,934,333 B1 | * | 8/2005 | Plissonneau et al. ... 375/240.16 |
| 2003/0016751 A1 | * | 1/2003 | Vetro et al. ............. 375/240.16 |

FOREIGN PATENT DOCUMENTS

| JP | 06-086272 | 3/1994 |
| JP | 09-051536 | 2/1997 |
| JP | 10-304401 | 11/1998 |
| JP | 11-122618 | 4/1999 |

OTHER PUBLICATIONS

C. Chang et al., "New Motion Estimation Algorithm for DV to MPEG1 Compression Domain Conversion"; International Conference on Consumer Electronics; Jun. 22-24, 1999; IEEE; pp. 158-159.

Japanese Office Action dated Jul. 12, 2006, issued in corresponding Japanese Application No. 2002-070878.

* cited by examiner

Primary Examiner—Gims Philippe
(74) Attorney, Agent, or Firm—Westerman, Hattori, Daniels & Adrian, LLP.

(57) ABSTRACT

Provided is a transcoder for coded video the encoding mode of that is changed according to the coded data, itself, that has been compressed by transcoding, or information prepared by decoding only a part thereof. A coded data extractor partially decodes DV coded data (a) that has been input, and sends DCT coefficients (b) to an approximate image generator and to a decoder, and outputs quantization parameters (c) to a first motion vector detector. The approximate image generator generates an approximate image according to a part of the DCT coefficients (b). A first motion vector detector roughly detects motion vector candidates (e). A second motion vector detector, using the motion vector candidates (e) as an initial position, hierarchically detects a motion vector (f). A re-encoder encodes the data into one the encoding mode of that is new, according to a luminance signal (h) that has been decoded in the decoder, the chrominance signal (j) the data format of that has been transcoded in a sampling format transcoder, and the motion vector (f) that has been detected in the second motion vector detector.

50 Claims, 4 Drawing Sheets

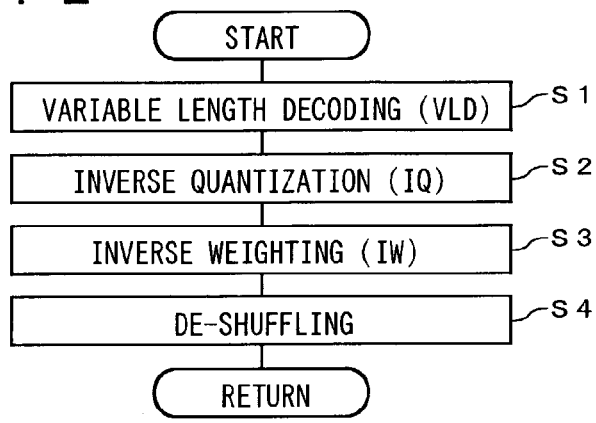
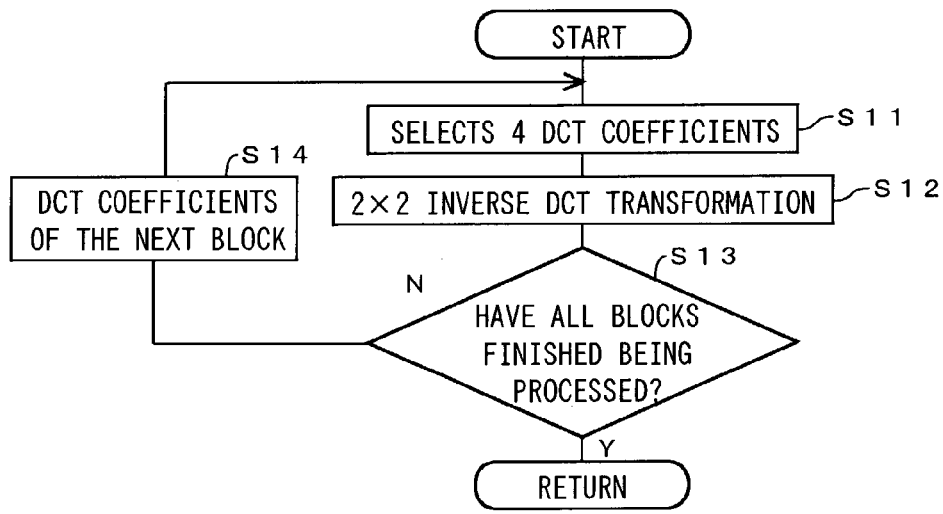
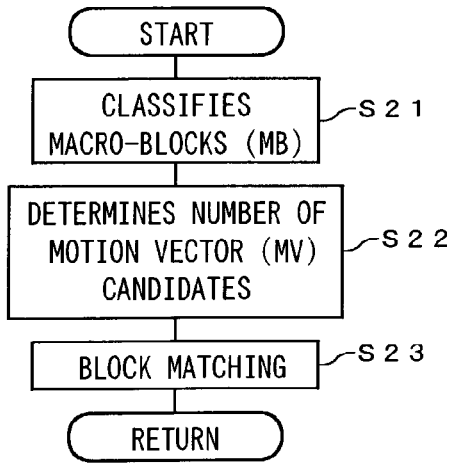

TRANSCODER FOR CODED VIDEO

BACKGROUND OF THE INVENTION

1. Field of the Invention

The present invention relates to a transcoder for coded video and, more particularly, to a transcoder for coded video that enables conversion of the encoding mode at a high speed and with a high accuracy according to compressed coded data, itself, the compression of that is performed utilizing a transcoding technique, or, data that is obtained by decoding only a part thereof.

2. Description of the Related Art

As a conventional technique for changing the mode of encoding, there has been reported a method that transcodes from a digital video (DV) format to an MPEG format. When transcoding DV data having no motion vector information therein to MPEG data, two ways of transcoding are considered as being available, one of which is a method wherein transcoding to MPEG is performed in a state where there exists no motion vector information and the other of which is a method wherein transcoding to MPEG is performed by setting motion vector information.

In the former method (hereinafter referred to as "the first transcoding method") wherein transcoding is performed without using any motion vector information, all data of the video are handled as intra-frame-coded frames (I-picture) and they are transcoded to MPEG data. In the latter method (hereinafter referred to as "the second transcoding method") wherein transcoding to MPEG is performed by setting motion vector information, searching the motion vector is hierarchically performed by applying 1-dimensional inverse DCT transformation in both the vertical direction and the horizontal direction.

In the second transcoding method, first, an optimum position as viewed in the horizontal direction is determined with low-resolution 1-dimensional inverse DCT transformation and, with respect to that place, an optimum position as viewed in the vertical direction is extracted as the motion vector. In the searching in the vertical direction, an approximate image wherein interpolation has been performed using a technique of bilinear interpolation is used so that the motion vector can be extracted with an accuracy with units of a 1 pixel. Next, the same processing is repeatedly performed with high-resolution 1-dimensional inverse DCT transformation. And, finally, the motion vector is detected according to the image the DV data of that has been completely decoded. By using that motion vector, transcoding from DV to MPEG is realized.

The lower the bit rate is, the more prominent the image quality improving effect attainable with use of the motion vector is. Therefore, the first transcoding method that does not utilize the motion vector information has a problem in that it is impossible to transcode to low-bit-rate MPEG data. On the other hand, since the second transcoding method utilizes the motion vector, the point in problem that is inherent in the first transcoding method is solved. However, that method has another problem in that it takes a large amount of time to execute processing for detecting the motion vector. Namely, since partially performing inverse DCT transformation with respect to the DCT coefficients, reducing the processing load is limited because of utilizing inverse DCT transformation. In addition, since interpolation processing for generating an approximate image also needs to be executed, suppressing the amount of calculation is difficult.

SUMMARY OF THE INVENTION

An object of the present invention is to provide a transcoder for coded data which can solve the above-described points in problem that are inherent in the conventional techniques and in which the mode of encoding is changed according to the coded data, itself, that has been compressed by transcoding, or, data that has been obtained by decoding only a part thereof. Another object of the invention is to provide a transcoder for coded data that can change the mode of encoding in a short time and with a high accuracy and can output image data.

In order to achieve the object, the invention is firstly characterized in that a transcoder for coded video comprises a coded data extractor that partially decodes coded information of compressed video data and extracts it; an approximate image generator that generates an approximate image from the coded information that has been extracted; a first motion vector detector that performs detection of motion vector candidates from the approximate image; a decoder that decodes the coded information and generates a luminance signal and a chrominance signal; a second motion vector detector that performs detection of a motion vector on the basis of the luminance signal that has been produced in the decoder and the motion vector candidates that have been detected in the first motion vector detector; and a re-encoder that performs re-encoding of the data on the basis of the motion vector information that has been detected in the second motion vector detector, the luminance signal that has been decoded in the decoder, and the chrominance signal the data format of that has been transcoded.

The invention is secondly characterized in that the transcoder for coded video further comprises a sampling format transcoder that has input thereto the chrominance signal output from the decoder and performs transcoding of the data format of the chrominance signal and outputs the transcoded data signal to the re-encoder.

According to the invention, since a processing time for detecting a motion vector and a load for processing are reduced, a mode of encoding can be transcoded in a short time and with a high accuracy.

BRIEF DESCRIPTION OF THE DRAWINGS

FIG. 2 is a flow chart illustrating the function of a coded data extractor;

FIG. 3 is a flow chart illustrating the function of an approximate image generator;

FIG. 4 is a flow chart illustrating the function of a first motion vector detector;

DETAILED DESCRIPTION OF THE PREFERRED EMBODIMENT

Hereinafter, the present invention will be explained in detail with reference to the drawings. It is to be noted that, although in the embodiment that will be explained below the DV format is used as the format of input video data, the present invention is not limited thereto.

Figure 1:
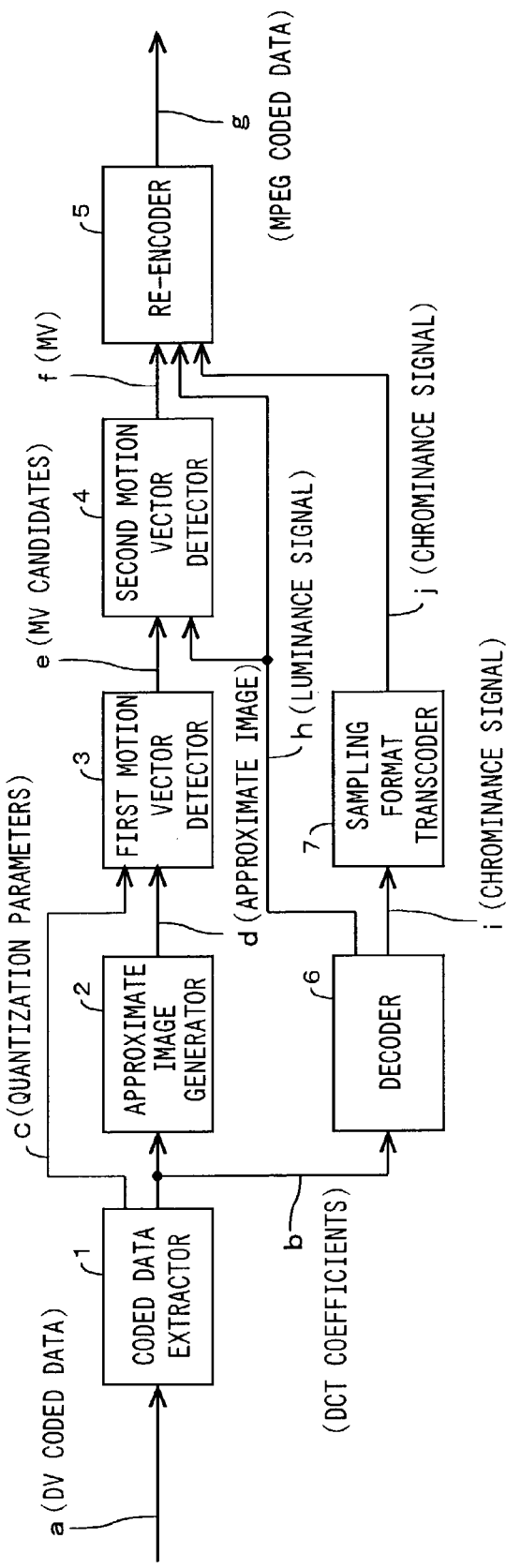
FIG. 1 is a block diagram illustrating the construction of an embodiment of the present invention.

FIG. 1 is a block diagram illustrating the entire construction of the embodiment of the present invention. As the input with respect to the entire system, DV coded data (a) of the video that has been compressed and encoded according to the DV format is given. A coded data extractor 1 partially decodes the DV coded data (a) that has been input to generate DCT coefficients (b) and quantization parameters (c). The DCT coefficients (b) are sent to an approximate image generator 2 and to a decoder 6 while the quantization parameters (c) is sent to a first motion vector detector (the term "detector" is used herein as being substantially the same as the term "estimator") 3.

The approximate image generator 2 generates an approximate image according to a part of the DCT coefficients (b) that have been extracted by the coded data extractor 1. For generating an approximate image, as will be apparent from the explanation that will be later given, as an example, there are utilized a direct-current component and three biased-toward-low-frequency alternating-current components that serve as the DCT coefficients. The approximate image (d) that has been generated is sent to the first motion vector detector 3.

The first motion vector detector 3 roughly detects motion vector (MV) candidates according to the approximate image (d) that has been generated in the approximate image generator 2 and the quantization parameters (c) that has been extracted in the coded data extractor 1. The motion vector candidates (e) that have been detected are sent to a second motion vector detector 4.

The decoder 6 performs inverse transformation with respect to the DCT coefficient (b) that has been obtained in the coded data extractor 1 and thereby restores the data to a luminance signal (h) and a chrominance signal (i). The luminance signal (h) is output to the second motion vector detector 4 and also to the re-encoder 5 while the chrominance signal (i) is output to a sampling format transcoder 7.

The sampling format transcoder 7 has input thereto the chrominance signal (i) that has been decoded in the decoder 6 and, if the data construction of the chrominance signal (i) is different from the data construction that is used therein, performs transcoding with respect to the sampling data format. The chrominance signal (j) the data format of that has been transcoded like that is output to the re-encoder 5.

The second motion vector detector 4 has input thereto the motion vector candidates (e) that have been detected in the first motion vector detector 3 and the luminance signal (h) that has been decoded in the decoder 6. And, using the motion vector candidates (e) as the initial positions, the detector 4 detects hierarchically a motion vector (f). The motion vector (f) that has been detected is output to the re-encoder 5.

According to the luminance signal (h) that has been decoded in the decoder 6, the chrominance signal (j) the data format of that has been transcoded in the sampling format transcoder 7, and the motion vector (f) that has been detected in the second motion vector detector 4, the re-encoder 5 performs encoding of the input data so that it may have a new mode of encoding. However the sampling format transcoder 7 can be omitted.

Next, the operations or functions of the above-described respective constituent elements 1 to 7 will be explained in detail.

FIG. 2 is a flow chart illustrating the operation of the coded data extractor 1. The coded data extractor 1 executes four kinds of processing operations that are variable length decoding (VLD) processing, inverse quantization (IQ) processing, inverse weighting (IW) processing, and de-shuffling processing. The coded data extractor 1, through executing its processing steps S1 to S4, decodes DV compressed coded data (a) that has been input thereto, up to de-shuffling of the DCT coefficients in MPEG mode and outputs the DCT coefficients (b), which have been obtained by that decoding, to the approximate image generator 2 and to the decoder 6. It also outputs the quantization parameters (c) to the first motion vector detector 3.

Incidentally, the chrominance signal of the DV coded data (a) that enters the coded data extractor 1 is a 4:1:1 signal that has been obtained by performing sub-sampling to ¼, in the horizontal direction, in comparison with the luminance signal, or, a 4:2:0 signal that has been obtained by performing sub-sampling to ½, in both the horizontal and vertical directions, in comparison with the luminance signal.

FIG. 3 is a flow chart illustrating the operation of the approximate image generator 2. The approximate image generator 2 executes processing of selecting four components of DCT coefficients (step S11) and processing of performing 2×2 inverse DCT transformation (step S12).

Figure 6:
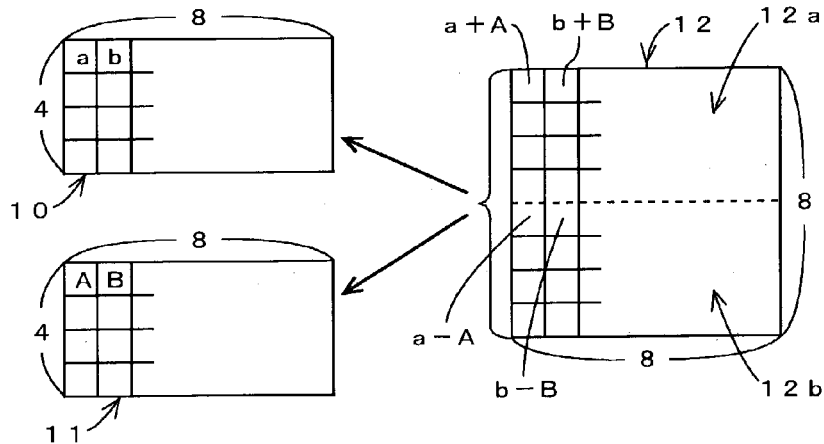
FIG. 6 is an explanatory view of a 2-4-8-coefficient separation operation.

Namely, in the step S11, in case of an 8-8 DCT mode, from 64 DCT coefficients that have been obtained using 8×8 pixels as the unit block (the unit frame), only four low-frequency components that are located at the positions (0, 0), (0, 1), (1, 0), and (1, 1) are selected as the DCT coefficients obtained when using 2×2 pixels as the unit block. On the other hand, in case of a 2-4-8 DCT mode, as illustrated in FIG. 6, since the respective sums and respective differences of two sets of 32 pieces of DCT coefficients 10, 11 that are obtained using 4×8 pixels as the unit block (the unit field) are stored in one group (frame) of 8×8 DCT coefficients 12, regarding the sum DCT coefficients only four low-frequency components that are located in the places (0, 0), (0, 1), (1, 0), and (1, 1) are selected as the DCT coefficients obtained when using 2×2 pixels as the unit block.

In the step S12, 2×2 inverse DCT transformation is performed with respect to those four DCT coefficients that have been selected in the step S11. In either case of 8-8 DCT mode or 2-4-8 DCT mode, when performing inverse DCT transformation, the same base is used. The 2×2 matrix inverse DCT transformation is realized only with addition/subtraction operations and shift operation.

In the step S13, it is determined whether all the blocks have finished being processed. When "NO" determination is made, the flow proceeds to a step S14 in which the next-block DCT coefficients are input, and, in the step S11, four coefficients are selected from those DCT coefficients. When all the blocks have finished being processed, the determination in the step S13 is made as being "YES". Through these processing operations, an approximate image (d) the size of that is reduced to ¼ of the original image both longitudinally and laterally is produced. This approximate image (d) is output to the first motion vector detector 3. The processing operations of the approximate image generator 2 are thus completed.

FIG. 4 is a flow chart illustrating the operation of the first motion vector detector 3. The first motion vector detector 3 executes three processing operations. They are classifying processing of the macro-blocks (MB) (step S21), pieces number determining processing of the motion vector candidates (step S22), and block-matching processing (step S23). The first motion vector detector (estimator) 3 detects motion vectors from the approximate image with a low degree of resolution and outputs motion vector candidates (e) to the second motion vector detector 4.

In the DV (digital video) data, since, as the quantization parameters, any one of four kinds of quantization tables is given, when executing classification processing in step S21 the number of that relevant quantization table is acquired every block. And, the number of the blocks in which the quantization table that quantizes the most roughly is contained is termed as a class number every 2×2 block. For example, the numbers of the quantization tables are sequentially 0 to 3, according to the roughness of quantization, in the order in which that number which is smaller precedes. Therefore, any one of the 0 to 3 numbers is acquired as a class number therefor.

Or, every 2×2 blocks, the sum of the numbers of the quantization tables is acquired as a class number therefor. In this case, any one of the values 0 to 12 is acquired as a class number therefor.

The pieces number determination processing of motion vector candidates in the step S22 sets the maximum number of MV candidates according to the numerical value of the class number that has been obtained in the classification processing in the step S21. For example, as stated before, when having acquired any one numerical value of the class numbers 0 to 12, that processing utilizes the quotient obtained by dividing the numerical value of the class number by 4. If the class number that has been acquired attained is, for example, "12", the processing sets "3" as the maximum number of the motion vector candidates that that processing detects. When the degree of fineness of the quantizer for a respective macro-block is high, the block matching processing part in the next step S23 is omitted. Since the fact that the numerical value of the class number is great means that the texture of the relevant image is fine, searching that uses a reduced image the texture of that is lost has only a low level of reliability. In such a case, the processing utilizes an increased number of motion vector candidates.

In the block matching processing in the step S23, it detects motion vectors from the approximate image the size of that is ¼ of that of the original image. Therefore, it performs block matching by using 4×4 pixels, which correspond to the macro-block (16×16 pixels) of the original image, as the unit block. The first motion vector detector 3 calculates the sum of the absolute values of the differences between the pixels, and detects the position in which that sum becomes minimum as a motion vector candidate. If falling below the maximum pieces number of motion vector candidates, the position whose values are below the value that has been obtained by doubling the minimum sum of the absolute values of the differences between the pixels is also handled as the motion vector candidates. The thus-detected motion vector candidates (e) are output to the second motion vector detector 4. The processing operations of the first motion vector candidates are completed there.

Figure 5:
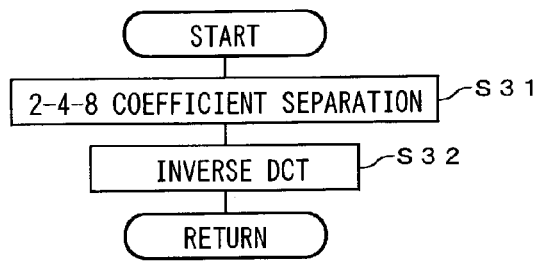
FIG. 5 is a flow chart illustrating the function of a decoder.

FIG. 5 is a flow chart illustrating the operation of the decoder 6. The decoder 6 produces a decoded image from the DCT coefficients that have been extracted in the decoded data extractor 1.

The decoder 6 executes 2-4-8 coefficient separation processing (step S31) and inverse DCT processing (step S32). The 2-4-8 coefficient separation processing in the step 31 performs separation processing of relevant coefficients with respect to a block of 2×4×8 DCT mode, namely re-constructs 64 pieces of coefficients that are stored in the form of the sums and differences of the coefficients into two blocks of 32 pieces of coefficients. Namely, as illustrated in FIG. 6, it re-constructs a 4×8 block 12a that is constructed of the sums of the coefficients of two 4×8 blocks and a 4×8 block 12b that is constructed of the differences thereof, into two 4×8 blocks 10 and 11.

The inverse DCT processing in the step S32 executes inverse DCT transformation with respect to all the DCT coefficients in the blocks 10, 11, thereby producing a luminance signal and a chrominance signal. The luminance signal of the thus-decoded image is sent to the second motion vector detector 4 and to the re-encoder 5. The chrominance signal (i) of the thus-decoded image is sent to the sampling format transcoder 7. The processing operations of the decoder 6 are completed there.

Figure 7:
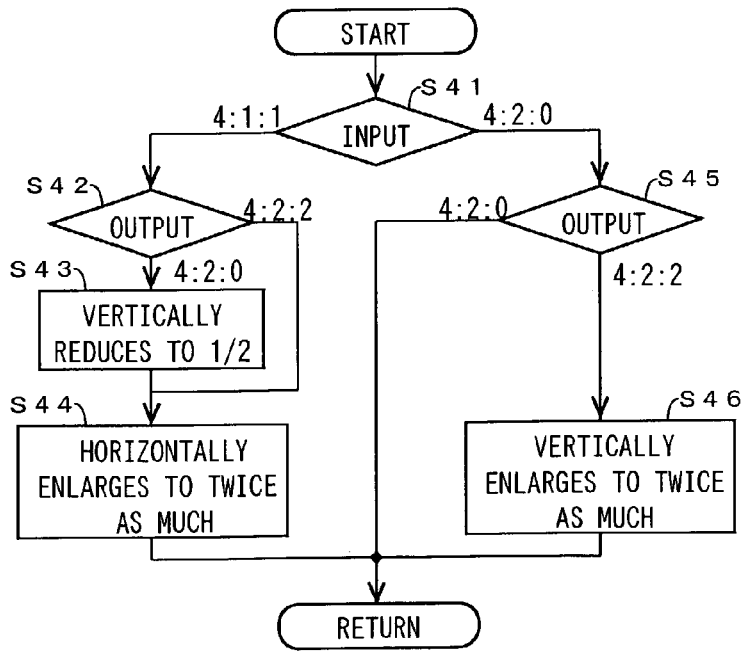
FIG. 7 is a flow chart illustrating the function of a sampling converter.

FIG. 7 is a flow chart illustrating the operation of the sampling format transcoder 7. The data format of the sampling is different between the DV and the MPEG. Regarding the luminance signal, that is the same between the two. However, regarding the chrominance signal, the difference exists between the two. Therefore, regarding the chrominance signal (i), transcoding of the sampling format is performed. The sampling format transcoder 7 is constructed of reduction processing and enlargement processing.

Figure 8:
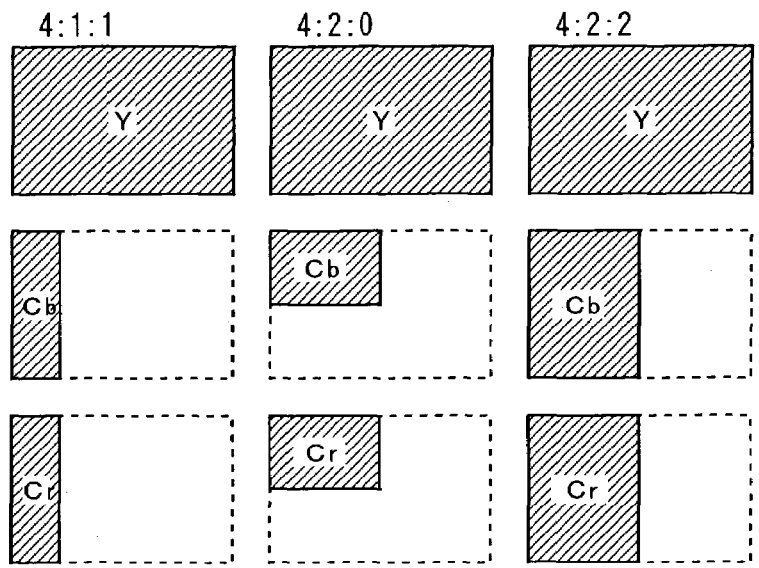
FIG. 8 is an explanatory view of the arrangements 4:1:1, 4:2:0, and 4:2:2 each of that is the construction of a luminance signal and chrominance signal.

FIG. 8 illustrates the respective constructions of the luminance signal (Y) and chrominance signal (Cb, Cr) in the form of 4:1:1, 4:2:0, and 4:2:2. The 4:1:1 signal represents a signal wherein the chrominance signal is sub-sampled to ¼, in the horizontal direction, in comparison with the luminance signal, the 4:2:0 signal represents a signal wherein the chrominance signal is sub-sampled to ½, in both the horizontal and vertical directions, in comparison with the luminance signal, and the 4:2:2 signal represents a signal wherein the chrominance signal is sub-sampled to ½, in the horizontal direction, in comparison with the luminance signal.

With reference to FIG. 8, the processing operations in FIG. 7 will be explained. First, an explanation is given of a case where the output signal that is required is 4:2:0. When the input in a step S41 is a PAL signal, since the DV chrominance signal is 4:2:0, no processing is executed in the chrominance signal data format transcoder. On the other hand, when that input is an NTSC signal, since the DV chrominance signal is 4:1:1, the processing flow proceeds to steps S42, S43, and S44, thereby transcoding the 4:1:1 chrominance signal into a 4:2:0 chrominance signal. Reduction processing is executed in the way in which an average is calculated every two 4:1:1 chrominance signals that are arrayed in the reduction direction, whereby that average is used as a new value and thereby reduced to ½. Enlargement processing is executed in the way in which an average is calculated every two values that are arrayed in the enlargement direction, whereby that value is inserted between those two values as an interpolation value, thereby enlarging to twice as much. The 4:2:0 chrominance signal that has been obtained by transcoding is output to the re-encoder 5.

On the other hand, when the output that is required is 4:2:2, the processing for transcoding is executed regardless of whether the input signal is an NTSC or a PAL signal. Namely, when the input in the step S41 is a PAL type, the flow proceeds to steps S45 and S46 and, through the execution of the enlargement processing in the step 46, the signal data is enlarged to twice as much in the vertical direction. When that input is an NTSC type, the flow proceeds to the steps S42 and S44. Thereby, through executing horizontal doubling-enlargement processing in the step S44, the 4:1:1 signal is doubled in the horizontal direction.

Figure 9:
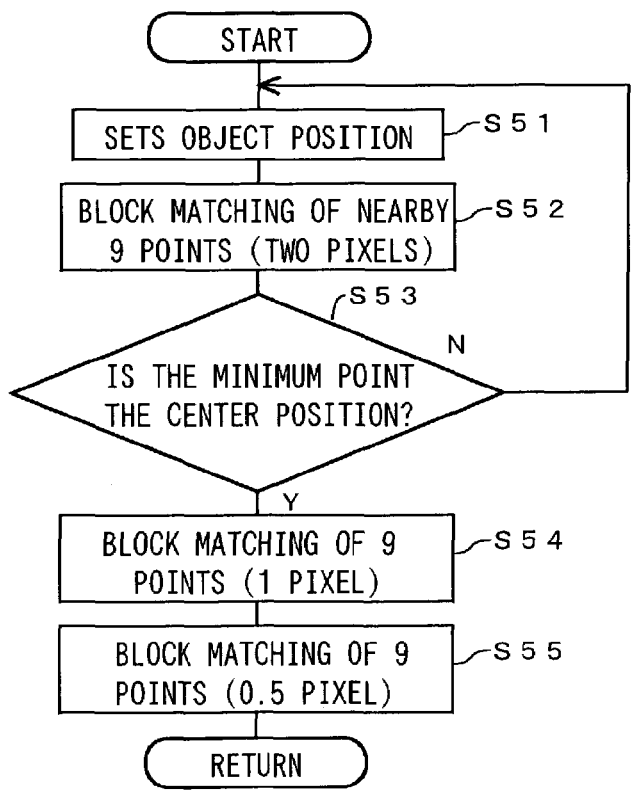
FIG. 9 is a flow chart illustrating the function of a second motion vector detector.

FIG. 9 is a flow chart illustrating the operation of the second motion vector detector 4. The second motion vector detector 4 increases the space resolution of the motion vector (e) detected in the first motion vector detector 3, with use of the luminance signal (h) that has been decoded in the decoder 6, and determines an accurate motion vector. The second motion vector detector 4 is constructed mainly of setting processing (step S51) for setting the object position that is to be detected and block matching processing (step S52) that is executed with respect to the object positions. The detector 4 performs hierarchical convergence of the detection objects.

The setting processing in the step S51 that sets the object position is executed as follows. Namely, as initial setting, the motion vector that was previously detected is added, as motion vector candidates, to the detected result of the first motion vector detector 3. And, those motion vector candidates are determined as the center position for performing detection, and the nearby distance from that center position to the blocks that surround it is set to be two pixels. However, when the motion vector candidates (e) that the first motion vector detector 3 has detected exist a plurality of pieces in number, this processing operation determines the sum of the absolute values of the differences every candidate and determines the point at which that sum becomes minimal as the center position. In this setting processing, 9 points obtained by adding up the center position and its surrounding 8 points that are spaced by the designated distance from that center position are used as the detection objects.

In the block matching processing in the step 52, calculation is performed of the sum of the absolute values of the differences, every block, regarding each of the 9 designated points, and searching is performed of the point at which that sum is minimum. In the next step S53, it is determined whether the point at which that sum has become minimum is the center position. When the point is not the center position, the flow returns to the step S51, in which, using the point where that sum is minimum as a new center position, the same processing is repeated within the range of detection. When "YES" determination is made in the step S53, the flow proceeds to the next step S54 in which the nearby distance that represents the distance up to the surrounding block is set to be 1 pixel. And, calculation is performed of the sum of the absolute values of the differences, every block, regarding each of the 9 designated points, and searching is performed of the point at which the sum is minimum.

Next, the flow proceeds to a step S55. With the nearby distance being set to be 0.5 pixel, there is determined the minimum value of the sums of the absolute values of the differences that correspond to the 9 points that have been designated. Thereby, the point at which that sum is minimum is determined as being the motion vector. Also, in the processing of block-matching, in the process in which the sum of the absolute values of the differences is calculated, this sum is always compared with the minimum sum value of the absolute values of the differences that has been obtained by that point in time. The moment that sum has exceeded that minimum sum value, the calculation, currently performed, of the sum of the difference absolute values is interrupted. And, the processing determines that that sum is not the motion vector. The motion vector (f) that is the detected result of the second motion vector detector 4 is sent to the re-encoder 5. The processing of the second motion vector detector 4 is thus completed.

The re-encoder 5 performs MPEG encoding according to the luminance signal (h) that has been decoded in the decoder 6, the chrominance signal (j) that has been obtained by performing data format conversion with respect to the sampling format transcoder 7, and the motion vector (f) that has been detected in the second motion vector detector 4. Thus the DV coded data is transcoded to MPEG coded data.

As will be apparent from the foregoing explanation, according to the present invention, since it is arranged to directly utilize the video data that has been compression-encoded by transcoding, it becomes possible to detect or estimate the motion vector with a high speed and with a high accuracy. In addition, as a result of that, the invention method can enhance the quality of a relevant image in comparison with the conventional data transcoding method (the above-described "first transcoding method") in which relevant data has no motion vector therein.

Also, since an approximate image can be produced by simple calculation operation from a part of the coded data, it becomes possible to detect the motion vector with a high speed. As a result of this, even when compared to the data transcoding method (the above-described "second transcoding method") in which transcoding is performed by detecting the motion vector, the invention method becomes able to suppress a cost of processing that is applied to the detection or estimation of the motion vector.

What is claimed is:

1. A transcoder for coded video, which performs transcoding an encoding mode, and outputting, comprising:
    a coded data extractor that partially decodes coded information of compressed video data and extracts it;
    an approximate image generator that generates an approximate image from the coded information that has been extracted;
    a first motion vector detector that performs detection of motion vector candidates from the approximate image;
    a decoder that decodes the coded information and generates a luminance signal and a chrominance signal;
    a second motion vector detector that performs detection of a motion vector on the basis of the luminance signal that has been produced in the decoder and the motion vector candidates that have been detected in the first motion vector detector; and
    a re-encoder that performs re-encoding of the data on the basis of the motion vector information that has been detected in the second motion vector detector, the luminance signal that has been decoded in the decoder, and the chrominance signal the data format of that has been transcoded.

2. A transcoder for coded video, which performs transcoding an encoding mode, and outputting, comprising:
    a coded data extractor that partially decodes coded information of compressed video data and extracts it;
    an approximate image generator that generates an approximate image from the coded information that has been extracted;
    a first motion vector detector that performs detection of motion vector candidates from the approximate image;
    a decoder that decodes the coded information and generates a luminance signal and a chrominance signal;
    a sampling format transcoder that has input thereto the chrominance signal output from the decoder and performs transcoding of the data format of the chrominance signal and outputs the transcoded data signal to the re-encoder;
    a second motion vector detector that performs detection of a motion vector on the basis of the luminance signal that has been produced in the decoder and the motion vector candidates that have been detected in the first motion vector detector; and a re-encoder that performs re-encoding of the data on the basis of the motion vector information that has been detected in the second motion vector detector, the luminance signal that has been decoded in the decoder, and the chrominance signal the data format of that has been transcoded.

3. A transcoder for coded video according to claim 1, wherein input information to the coded data extractor is video data that has been compressed by only intra-frame encoding; and output information from the re-encoder is video data that has been compression-encoded in a hybrid mode of using intra-frame encoding and inter-frame encoding techniques.

4. A transcoder for coded video according to claim 2, wherein input information to the coded data extractor is video data that has been compressed by only intra-frame encoding; and output information from the re-encoder is video data that has been compression-encoded in a hybrid mode of using intra-frame encoding and inter-frame encoding techniques.

5. A transcoder for coded video according to claim 3, wherein the chrominance signal of the input information is one of a 4:1:1 signal that is obtained by horizontally sub-sampling to ¼ in comparison with the luminance signal, and a 4:2:0 signal that is obtained by horizontally and vertically sub-sampling to ½ in comparison with the luminance signal.

6. A transcoder for coded video according to claim 4, wherein the chrominance signal of the input information is one of a 4:1:1 signal that is obtained by horizontally sub-sampling to ¼ in comparison with the luminance signal, and a 4:2:0 signal that is obtained by horizontally and vertically sub-sampling to ½ in comparison with the luminance signal.

7. A transcoder for coded video according to claim 3, wherein the chrominance signal of the output information is one of a 4:2:0 signal that is obtained by horizontally and vertically sub-sampling to ½ in comparison with the luminance signal, and a 4:2:2 signal that is obtained by horizontally sub-sampling to ½ in comparison with the luminance signal.

8. A transcoder for coded video according to claim 4, wherein the chrominance signal of the output information is one of a 4:2:0 signal that is obtained by horizontally and vertically sub-sampling to ½ in comparison with the luminance signal, and a 4:2:2 signal that is obtained by horizontally sub-sampling to ½ in comparison with the luminance signal.

9. A transcoder for coded video according to claim 1, wherein the coded data extractor extracts transcoding coefficients and quantization parameters from the compressed video data that has been input, outputs the transcoding coefficients to the approximate image generator and to the decoder, and outputs the quantization parameters to the first motion vector detector.

10. A transcoder for coded video according to claim 2, wherein the coded data extractor extracts transcoding coefficients and quantization parameters from the compressed video data that has been input, outputs the transcoding coefficients to the approximate image generator and to the decoder, and outputs the quantization parameters to the first motion vector detector.

11. A transcoder for coded video according to claim 9, wherein when transcoding data is constructed for each field the coded data extractor, outputs encoding coefficients of the sums of, and the differences between, the transcoding coefficients of a first field stored and the transcoding coefficients of a second field stored.

12. A transcoder for coded video according to claim 10, wherein when transcoding data is constructed for each field the coded data extractor, outputs encoding coefficients of the sums of, and the differences between, the transcoding coefficients of a first field stored and the transcoding coefficients of a second field stored.

13. A transcoder for coded video according to claim 1, wherein the approximate image generator generates an approximate image by decoding only low frequency components of the transcoding coded data signal.

14. A transcoder for coded video according to claim 2, wherein the approximate image generator generates an approximate image by decoding only low frequency components of the transcoding coded data signal.

15. A transcoder for coded video according to claim 13, wherein when transcoding data is constructed for each field the approximate image generator, selects a direct-current component and three biased-toward-low-frequency alternating-current components from the sums of the coefficients of the first field and those of the second field stored.

16. A transcoder for coded video according to claim 14, wherein when transcoding data is constructed for each field the approximate image generator, selects a direct-current component and three biased-toward-low-frequency alternating-current components from the sums of the coefficients of the first field and those of the second field stored.

17. A transcoder for coded video according to claim 1, wherein the approximate image generator generates an approximate image by performing inverse transcoding for 2×2 coefficients, with respect to the four selected coefficients.

18. A transcoder for coded video according to claim 2, wherein the approximate image generator generates an approximate image by performing inverse transcoding for 2×2 coefficients, with respect to the four selected coefficients.

19. A transcoder for coded video according to claim 17, wherein the approximate image generator, in either case of the transcoding data constructed for each frame and that constructed for each field, performs inverse transcoding by inverse transcoding that uses the same transcoding base to thereby produce an approximate image.

20. A transcoder for coded video according to claim 18, wherein
the approximate image generator, in either case of the transcoding data constructed for each frame and that constructed for each field, performs inverse transcoding by inverse transcoding that uses the same transcoding base to thereby produce an approximate image.

21. A transcoder for coded video according to claim 1, wherein the first motion vector detector performs a motion vector detection on the basis of the motion vector detection result obtained from an approximate image of low resolution and the second motion vector detector performs motion vector searching with a high resolution so that the second motion vector detection is performed by hierarchically utilizing a plurality of images different in resolution.

22. A transcoder for coded video according to claim 2, wherein the first motion vector detector performs a motion vector detection on the basis of the motion vector detection result obtained from an approximate image of low resolution and the second motion vector detector performs motion vector searching with a high resolution so that the second motion vector detection is performed by hierarchically utilizing a plurality of images different in resolution.

23. A transcoder for coded video according to claim 21, wherein,
when the degree of fineness of the quantizer for a respective macro-block is high, the first motion vector detector has the use thereof omitted.

24. A transcoder for coded video according to claim 22, wherein,
when the degree of fineness of the quantizer for a respective macro-block is high, the first motion vector detector has the use thereof omitted.

25. A transcoder for coded video according to claim 1, wherein
the first motion vector detector changes the number of the motion vector candidates on the basis of the quantization parameters sent from the coded data extractor.

26. A transcoder for coded video according to claim 2, wherein
the first motion vector detector changes the number of the motion vector candidates on the basis of the quantization parameters sent from the coded data extractor.

27. A transcoder for coded video according to claim 25, wherein
the first motion vector detector increases the number of the motion vector candidates as the degree of fineness of the quantizer for a each macro-block becomes low.

28. A transcoder for coded video according to claim 26, wherein
the first motion vector detector increases the number of the motion vector candidates as the degree of fineness of the quantizer for a each macro-block becomes low.

29. A transcoder for coded video according to claim 1, wherein
the sampling format transcoder is constructed with combinations of horizontally and vertically enlargement and reduction processings.

30. A transcoder for coded video according to claim 2, wherein
the sampling format transcoder is constructed with combinations of horizontally and vertically enlargement and reduction processings.

31. A transcoder for coded video according to claim 29, wherein,
when transcoding a 4:1:1 signal to a 4:2:0 signal, the sampling format transcoder first vertically reduces and then horizontally enlarges the 4:1:1 signal;
when transcoding the 4:1:1 signal to a 4:2:2 signal, the sampling format transcoder horizontally enlarges the 4:1:1 signal; and
when transcoding the 4:2:0 signal to the 4:2:2 signal, the sampling format transcoder vertically enlarges the 4:2:0 signal.

32. A transcoder for coded video according to claim 30, wherein,
when transcoding a 4:1:1 signal to a 4:2:0 signal, the sampling format transcoder first vertically reduces and then horizontally enlarges the 4:1:1 signal;
when transcoding the 4:1:1 signal to a 4:2:2 signal, the sampling format transcoder horizontally enlarges the 4:1:1 signal; and
when transcoding the 4:2:0 signal to the 4:2:2 signal, the sampling format transcoder vertically enlarges the 4:2:0 signal.

33. A transcoder for coded video according to claim 29, wherein,
when the input and output of the sampling format transcoder are each a 4:2:0 signal, the sampling format transcoder does not execute any processing.

34. A transcoder for coded video according to claim 30, wherein,
when the input and output of the sampling format transcoder are each a 4:2:0 signal, the sampling format transcoder does not execute any processing.

35. A transcoder for coded video according to claim 1, wherein
the second motion vector detector is inputted with the motion vector candidates from the first motion vector detector and the luminance signal from the decoder to detect a motion vector, and output the motion vector to the re-encoder.

36. A transcoder for coded video according to claim 2, wherein
the second motion vector detector is inputted with the motion vector candidates from the first motion vector detector and the luminance signal from the decoder to detect a motion vector, and output the motion vector to the re-encoder.

37. A transcoder for coded video according to claim 35, wherein
the motion vector previously detected is added as the motion vector candidates.

38. A transcoder for coded video according to claim 36, wherein
the motion vector previously detected is added as the motion vector candidates.

39. A transcoder for coded video according to claim 35, wherein
when a plurality of the motion vector candidates exist, the second motion vector detector uses the point at which the sum of the absolute values of the differences becomes minimal as an initial value.

40. A transcoder for coded video according to claim 36, wherein
when a plurality of the motion vector candidates exist, the second motion vector detector uses the point at which the sum of the absolute values of the differences becomes minimal as an initial value.

41. A transcoder for coded video according to claim 35, wherein the second motion vector detector determines the motion vector candidate that has been detected by the first motion vector detector to be an initial value for performing searching operation and performs detection of the motion vector by using the initial value as a center.

42. A transcoder for coded video according to claim 36, wherein the second motion vector detector determines the motion vector candidate that has been detected by the first motion vector detector to be an initial value for performing searching operation and performs detection of the motion vector by using the initial value as a center.

43. A transcoder for coded video according to claim 41, wherein, in a block matching that is performed in the second motion vector detector, in the process of calculation of the sum of the absolute values of the differences that is performed for each block, the moment when the current sum value that has been obtained has just exceeded the minimum value of the sum of the absolute values of the differences, up to the present, calculation of that block is interrupted and it is determined that that sum value is inadequate.

44. A transcoder for coded video according to claim 42, wherein, in a block matching that is performed in the second motion vector detector, in the process of calculation of the sum of the absolute values of the differences that is performed for each block, the moment when the current sum value that has been obtained has just exceeded the minimum value of the sum of the absolute values of the differences, up to the present, calculation of that block is interrupted and it is determined that that sum value is inadequate.

45. A transcoder for coded video according to claim 43, wherein in the block matching, scanning of the search position is performed for each two pixels, and the unit of scanning is made stepwise smaller up to a lesser number of pixel components.

46. A transcoder for coded video according to claim 44, wherein in the block matching, scanning of the search position is performed for each two pixels, and the unit of scanning is made stepwise smaller up to a lesser number of pixel components.

47. A transcoder for coded video according to claim 43, wherein in the block matching, a position at which the sum of the absolute values of the differences has a minimum value is detected from the initial position and neighborhood 8 points.

48. A transcoder for coded video according to claim 44, wherein in the block matching, a position at which the sum of the absolute values of the differences has a minimum value is detected from the initial position and neighborhood 8 points.

49. A transcoder for coded video according to claim 43, wherein in the block matching, a point at which the sum has a minimum value is used as a new initial position, block matching is repeatedly performed between the new initial position and its neighborhood 8 points, and, when a minimum value does not exist within a range of search and in the vicinity, new initial position is determined to be the motion vector.

50. A transcoder for coded video according to claim 44, wherein in the block matching, a point at which the sum has a minimum value is used as a new initial position, block matching is repeatedly performed between the new initial position and its neighborhood 8 points, and, when a minimum value does not exist within a range of search and in the vicinity, new initial position is determined to be the motion vector.

* * * * *